Jan. 12, 1943. W. H. WAGGAMAN 2,308,220
PROCESS FOR MANUFACTURING SUPERPHOSPHATES
Filed Aug. 29, 1941

Inventor
WILLIAM H. WAGGAMAN
By Ernest S. Mechlin
his Attorney

Patented Jan. 12, 1943

2,308,220

UNITED STATES PATENT OFFICE 2,308,220

PROCESS FOR MANUFACTURING SUPERPHOSPHATES

William H. Waggaman, Baltimore, Md.

Application August 29, 1941, Serial No. 408,873

3 Claims. (Cl. 71—40)

This application is a continuation in part of my co-pending application, Serial No. 373,829, filed January 9, 1941, and relates to the production of fertilizers and more particularly to the manufacture of superphosphates by the acidulation of phosphate rock with sulphuric acid.

The primary object of the invention is to provide a process of producing superphosphates more economically than has heretofore been possible.

Another object of the invention is to provide a method of acidulating phosphate rock with sulphuric acid by which a reduction of the acid-rock ratio below that normally employed is made feasible without sacrifice in the conversion of the insoluble phosphates into an available form.

Another object of the invention is to provide a method of processing phosphate rock by which the porous or cellular mass produced on the initial acidulation of the rock is subsequently rendered more dense and the conversion of the residual rock into an available form is promoted.

A further object of the invention is to provide a process of producing superphosphates whereby a product is obtained which is superior in physical and chemical properties to the superphosphates manufactured in the usual manner.

A still further object of the invention is to provide a process of manufacturing superphosphates from phosphate rock whereby a product is obtained which has less free acid and hence is less corrosive of handling equipment and the containers in which it is stored and shipped than the superphosphates now in use.

An additional object of the invention is to provide a process of manufacturing superphosphates from phosphate rock whereby a dense dry granular product is obtained which, because of its physical and chemical nature, has little tendency to set when stored alone or mixed with other fertilizer materials, thus enabling the superphosphate to flow freely through the fertilizer distributing machine and be uniformly and readily distributed over a field.

These and other objects will appear hereinafter in the detailed description of the invention and be particularly pointed out in the appended claims.

Throughout the drawing and specification like parts are designated by like reference characters.

Figure 1:
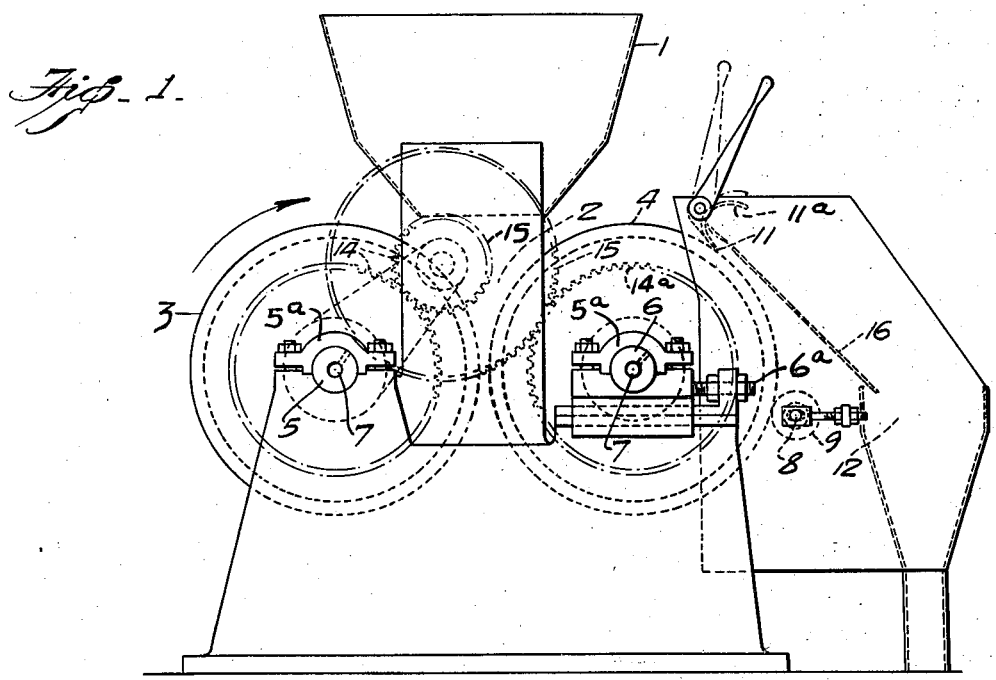
Figure 1 is a side elevational view of a machine for pressing phosphates.
Figure 2:
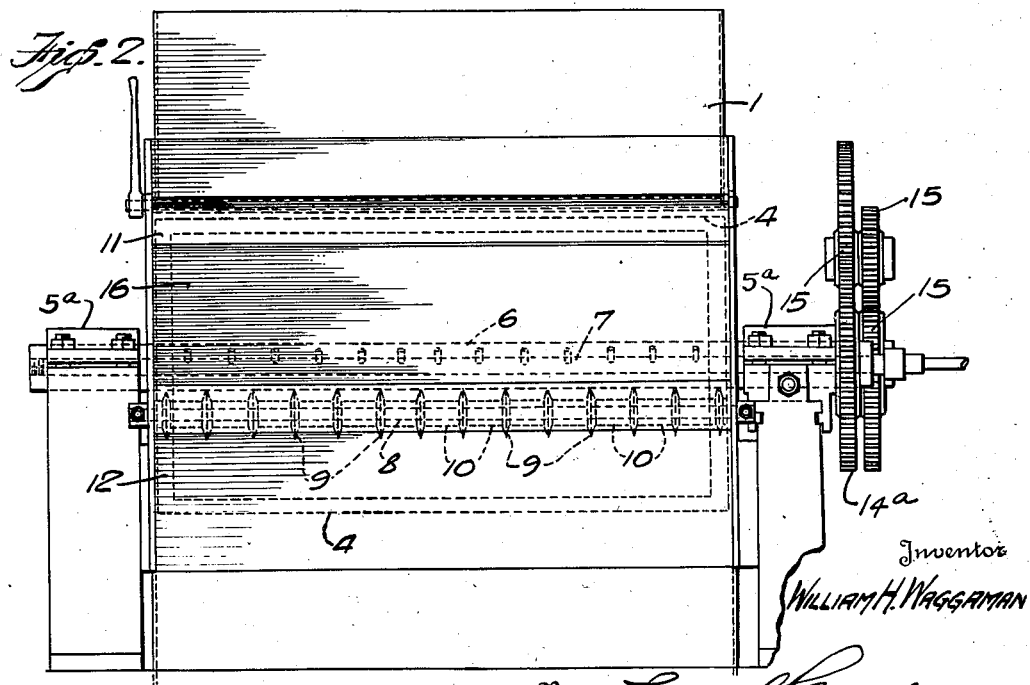
Figure 2 is an end elevation view of the machine shown in Figure 1.

In the ordinary method of manufacturing superphosphate, finely ground phosphate rock and sulphuric acid are intimately mixed in some standard type of mechanical mixing device equipped with stirring arms and then discharged as a slurry or muddy mass into a den or reaction chamber where the chemical actions continue and the product sets up as a porous cake. In order to facilitate the reactions, drive off certain gaseous compounds of fluorine, evaporate free water from the mass, and thus obtain a relatively dry product, it is customary to employ rather concentrated sulphuric acid, and also to heat this acid to a temperature ranging from 125° to 140° F. The concentration of the acid employed ranges between 54° and 56° Bé. (68.13 percent to 71.17 percent $H_2SO_4$) with an average concentration of about 55° Bé. (69.65 percent $H_2SO_4$). When acid of this concentration is heated and mixed with finely ground phosphate rock, the temperature of the resultant mass rises well above the boiling point of water and hence much vapor and gaseous fluorine compounds are evolved. The resultant product consists chiefly of a mixture of monocalcium phosphate, anhydrous calcium sulphate (anhydrite), some free acid and from 8 to 12 percent of free moisture. After curing, the free acid and moisture are reduced, due to both drying out and further chemical reactions.

In order to drive off a still greater proportion of the free moisture and to thus increase the percentage of $P_2O_5$ in the final product, certain manufacturers of superphosphate dry this product in a rotary cylinder heated by a direct flame or indirectly with steam. Due to the rotary motion of the cylindrical drier, the product thus formed is in the form of porous granules or pellets.

The ratio of sulphuric acid to finely ground phosphate rock ordinarly employed varies somewhat according to the nature of the phosphate rock and the concentration of the acid employed, but the average acid-rock ratio in terms of 55° Bé. acid is in the neighborhood of 86/100 where Florida pebble phosphate is employed, and about 89/100 where Tennessee brown rock phosphate is used.

It has heretofore been believed that unless the ratio of acid to the rock dust employed is relatively high substantially complete conversion of the $P_2O_5$ into an available form was not obtained. This theory was based upon the porous nature of the product brought about by the evolution of the gaseous products and partially due to the limited quantity of activating acid in a liquid phase present in the mass when concentrated acid is employed. I have discovered, however, that it is possible to obtain substantially complete conversion of the phosphate rock dust into available $P_2O_5$ where the ratio of acid to rock dust is materially reduced from that commonly used in this connection.

By utilizing a very much lower ratio between rock dust and acid than is commonly employed and by allowing the mixed mass to partially cure or harden in a den and by then subjecting the cured or "set up" denned product to further mixing and pressure the ultimate product of my process, besides possessing highly desirable mechanical properties, shows by analysis to contain as much available $P_2O_5$ as has been obtained in the past with the higher ratio between acid and rock dust.

In carrying out my invention I have found that I may utilize sulphuric acid of a concentration varying between 50° Bé. and 56° Bé. A slightly higher percentage of available $P_2O_5$ is obtained by utilizing sulphuric acid having a concentration of approximately 53° Bé. When acid of this concentration is mixed with phosphate rock dust in the general ratio of approximately 79.5 acid to 100 parts rock dust, which, measured on the basis of 55° Bé. acid, gives a ratio of 76 to 100, I have found that if I permit the mixed product to cure or partially cure or "set up" in a den and then subject the "set up" product to a further mixing and to a high degree of pressure either with or without the application of heat, the resultant mass compares favorably with, so far as available $P_2O_5$ is concerned, the best product produced by any other method.

It is to be understood, however, that the invention is not limited to the particular concentration of acid specified or to a definite ratio between acid and rock dust. Phosphate rock from different sources varies in chemical composition and in other properties and it is therefore desirable to adjust the acid and rock dust ratio as well as the acid concentration so as to compensate for the physical and chemical nature of the rock dust to be treated.

The actual quantity of $H_2SO_4$ employed per unit of phosphate rock treated will vary according to the composition and fineness of the rock dust, but it has been found that the amount of acid required to convert the $P_2O_5$ of the rock into an available form is from 8 to 10 percent below that normally employed. As a specific example, when using Florida pebble phosphate, I employ acid rock ratios of from 75/100 to 78/100 instead of the average acid rock ration of 86/100 as ordinarily used, these ratios being calculated on the basis of 55° Bé. acid, and obtain fully as good conversions of the insoluble $P_2O_5$ into an available form.

In my co-pending application I have pointed out that to obtain the acid economy set forth therein it was desirable, if not absolutely necessary, to maintain the temperature of the mass during the mixing period at a predetermined point, preferably not greater than the boiling point of water, but I have since found that the cooling of the mixed mass, while beneficial, is not essential, in connection with the use of acid of concentrations running from 53° Bé. to 56° Bé., in order to obtain the same amount of conversion of the rock dust into available $P_2O_5$ as is commonly obtained by utilizing a higher ratio of acid to rock dust.

In carrying out my process, and assuming that the optimum concentration of sulphuric acid for the particular type of rock dust has been ascertained and that this optimum results in a ratio of acid of 76-78 to 100 parts rock dust, the ratio being measured on the basis of 55° Bé. acid, the rock dust and acid are placed in the ordinary mixer and thoroughly mixed for the necessary time period. It is then discharged into a den of any desired type and the product allowed to set or cure or harden until there is obtained in the den a substantially solid mass of material. The denned mass is rigid but, owing to the evolution of gases is, in fact, a cellular mass. The denned mass, when this stage is reached, is then excavated by any desired method and the product, after passing through the hopper 1, shown in the accompanying drawings, flows to the space 2 between the periphery of the metallic rolls 3 and 4. The rolls 3 and 4 are preferably rotatably mounted, by means of the shafts 5 and 6, in suitable fixed bearings 5ª. The distance between the centers of rotation of the rolls 3 and 4 may be varied by any desirable means, as for instance by screw 6ª, but preferably the contiguous surfaces of the rolls are spaced apart one-fourth of an inch.

As will be noted from the drawing, both the shafts 5 and 6 of the rolls 3 and 4 are provided with an opening 7 extending within the hollow roller by means of which steam may be introduced within the rollers to heat the surfaces thereof in order to cause a further drying of the compressed mass as it passes between the rolls and as it adheres to the surface of the roll 4. The speed of rotation of the rolls 3 and 4 differ and I have found it advantageous to cause the roll 4 to rotate at substantially one and one-half times the speed of rotation of the roll 3.

It is, of course, to be understood that the rolls 3 and 4 rotate in opposite directions, the roll 3 rotating in a clockwise direction, as indicated by the arrows, and the roll 4 in a counter-clockwise direction. The material in the hopper 1, by the difference in the speed of rotation of the rolls, is caused to be tumbled and mixed before passing between the contiguous surface of the rolls, at which point it is compressed so as practically to eliminate the cellular condition of the denned mass and to cause the product, after passing between the rolls, to be hard and dense.

Adjacent the surface of the roll 4 I mount on a shaft 8 a series of cutters 9, and interposed between each pair of adjacent cutters a thimble 10. The cutters 9 and the thimbles 10 are freely rotatable on the shaft 8 and the edges of the cutters are preferably tangent to the periphery of the roll 4. By this means the compressed layer of phosphate material is formed into a series of strips running circumferentially of the roll and at a point spaced from the shaft 8 in the direction of rotation of the roll 4 I provide a pivoted scraper bar 11 by means of which the strips formed by the cutters 9 are removed from the surface of the roll and deposited in the hopper 12 from which they may be conveyed either to storage or to grinding or crushing rolls so as to form the phosphate into a dense granular mass, the granules of which are substantially uniform in cross section.

The rolls 3 and 4 are preferably spaced, as stated above, so that their respective peripheries are so positioned as to cause the material to be greatly compressed as the same is forced between the rolls. The spacing between the rolls largely depends upon the character and consistency of the material and also upon the amount of product which it is desired to obtain from the rolls. It will be obvious that by changing the diameters and/or length of the roll, production can be increased or decreased and a like increase or decrease may be obtained by increasing or decreasing the rate of revolution.

The rolls are or may be driven by suitable gearing as shown, the respective gears 14 and 14ª being splined to the shafts 5 and 6, respectively, and driven by the intermeshing gears 15.

The scraper bar 11 is preferably provided with a curved surface 11a so that the compressed strips of superphosphate, as removed from the surface of the roll 4, will be directed onto the guide plate 16 and thence into the hopper 12.

Any kneading or further mixing of the denned product, which is immediately followed by the application of great pressure and by subjecting the compressed matter to a further drying step prior to removing the same from the surface of the roll, brings about a substantial increase in the available $P_2O_5$. As a result of my improved process, conversions of from 95% of the available $P_2O_5$ have been obtained using an acid-rock ratio of 76 to 100 based on 55° Bé. This amount of conversion has heretofore been obtained only by the employment of a very much higher percentage of acid with reference to rock dust than is employed in my process.

It has also been found that the product produced by the scrapers from the roll can be immediately dried without adversely affecting the resulting product, whereas unprocessed superphosphate is detrimentally affected to a high degree by being submitted to elevated temperatures.

The following table shows conclusively the beneficial effect of compressing the cured or partially cured denned product. The superphosphate, after being formed from mixing the run of the mill rock and 55° Bé. sulphuric acid with an acid ratio of 80 to 100 gave the following results:

| Sample Nos. | Time of curing (before pressing) | Total curing period | Total $P_2O_5$ | Insol. $P_2O_5$ | Avail. $P_2O_5$ | Conversion |
|---|---|---|---|---|---|---|
| Average of 4 samples (91A, 91A₁, 91A₂, 91A₃) | Days 1 2 | Days 8 | Per cent 21.70 | Per cent 1.26 | Per cent 20.44 | Per cent 94.2 |
| Average of 4 samples (91B, 91B₁, 91B₂, 91B₃) | ² 2 | 8 | 21.63 | 0.87 | 20.76 | 96.0 |
| Average of 12 samples (83B, 83B₈, 84B₂, 84B₄, 92A, 92A₁, 92A₂, 92A₄, 92A₃, 92A₄, 92A₅, 92A₆, 92A₇) | 1 4 | 11 | 21.24 | 1.43 | 19.81 | 93.3 |
| Average of 12 samples 83B₃, 83B₉, 84B₃, 84B₈, 92B, 92B₁, 92B₂, 92B₃, 92B₄, 92B₅, 92B₆, 92B₇) | ² 4 | 11 | 21.09 | 0.89 | 20.20 | 95.8 |

¹ Not pressed.
² Pressed.

The following table shows the effect of heating compressed and unprocessed superphosphates:

| Sample Nos. | Time of curing (before pressing) | Total curing period | Total $P_2O_5$ | Insol. $P_2O_5$ | Avail. $P_2O_5$ | Conversion |
|---|---|---|---|---|---|---|
| Average of 3 samples (92A₂, 92A₃, 92A₆) | Days 1 4 | Days 11 | Per cent 21.48 | Per cent 1.98 | Per cent 19.50 | Per cent 90.90 |
| Average of 4 samples (92B₂, 92B₃, 92B₆, 92B₇) | ² 4 | 11 | 21.30 | 0.87 | 20.43 | 96.00 |

¹ Not pressed.
² Pressed.

In this table it will be noted that both products were cured in the den four days and that the same identical materials were used. One product is compressed by being forced between the surfaces of rolls in accordance with my invention and the other is not treated in accordance with my process. The total conversion in the untreated superphosphate is only 90.90%, whereas in the compressed product the total conversion is 96%.

With an acid-rock ratio of 80 to 100, as shown in the last bracket of this table, there is a difference of slightly more than 5% conversion in the compressed product over the untreated product.

It will be noted from an inspection of the drawings and from the foregoing description that my improved process does not require complex machinery nor necessitate the use of combined drying and conveying cylinders heretofore considered essential in the production of superphosphate of similar nature. There is, therefore, by employing the method herein set forth, a saving to the manufacturers not only in the cost of machinery but a very marked saving in the amount of acid used. It is difficult to measure in actual dollars and cents the extent of saving since acid costs are continually mounting as more and more sulphuric acid is being utilized for direct defense projects. Taking sulphuric acid at the market cost prior to the present emergency and even considering the amortization of the cost of the necessary roller equipment and the operating means therefor, the saving runs to from ten to sixteen cents per ton. All increases in the prices of sulphuric acid over the base price increase this saving. Were the phosphate industry limited in output the saving mentioned would not perhaps be of vital importance but where the normal annual output of the phosphate industry exceeds four million tons of commercial superphosphate it will be obvious that the potential saving by the use of this new process, if utilized by the entire industry, would amount to approximately half million dollars a year without any loss in the availability for agricultural use for the superphosphate sold.

Having thus described my invention what I claim as new and desire to secure by Letters Patent is:

1. A method of increasing the available phosphate in a denned product formed by mixing sulphuric acid of approximately 53° Bé. with phosphate rock dust in the proportion of 76/100 on a basis of 55° Bé. acid, said method comprising subjecting the "set up" denned material to a further mixing and pressure by depositing said material between fixed positioned rolls, one of which rotates at a higher R. P. M. than the other, and finally removing the pressed material from the surface of one of said rolls.

2. A method of increasing the available phosphate in a cured material formed by mixing sulphuric acid of approximately 53° Bé. with phosphate rock dust in the proportion of 79/100, said method including the denning of said mixed product, allowing the denned material to "set up," subjecting the said "set up" denned material to further mixing and pressure by depositing said material between metallic rolls, one of which rotates at a higher R. P. M. than the other, and finally removing the compressed material from said rolls.

3. A method of increasing the available phosphate in a cured material formed by mixing sulphuric acid of approximately 53° Bé. with phosphate rock dust in the proportion of 79/100, said method including the denning of said mixed product, allowing the denned material to "set up," subjecting the "set up" denned material to further mixing and pressure by depositing said material between metallic rolls, one of which rotates at a higher R. P. M. than the other, heating the surface of one of said rolls to dry the compressed material, and finally removing said compressed material from the surface of said heated roll.

WILLIAM H. WAGGAMAN.